(12) United States Patent
Furuya

(10) Patent No.: US 6,972,432 B1
(45) Date of Patent: Dec. 6, 2005

(54) LIQUID CRYSTAL DISPLAY

(75) Inventor: Masato Furuya, Yokosuka (JP)

(73) Assignee: Victor Company of Japan, Limited, Kanagwa-ken (JP)

( * ) Notice: Subject to any disclaimer, the term of this patent is extended or adjusted under 35 U.S.C. 154(b) by 104 days.

(21) Appl. No.: 10/679,450

(22) Filed: Oct. 7, 2003

(30) Foreign Application Priority Data

Oct. 10, 2002 (JP) .............................. P2002-296904

(51) Int. Cl.⁷ ...................... H01L 29/04; G02F 1/1335
(52) U.S. Cl. ........................................ 257/59; 349/113
(58) Field of Search ........................... 257/59; 349/113

(56) References Cited

U.S. PATENT DOCUMENTS 6,400,426 B1 *  6/2002  Yamazaki et al. ............ 349/43
6,791,521 B2 *  9/2004  Isami et al. .................... 345/89

FOREIGN PATENT DOCUMENTS

| JP | 03-018892 | 1/1991 |
| JP | 2001-075534 | 3/2001 |
| JP | 2001-255858 | 9/2001 |
| WO | WO 89/02144 | 3/1989 |

* cited by examiner

*Primary Examiner*—David Nelms
*Assistant Examiner*—Long Tran
(74) *Attorney, Agent, or Firm*—Nath & Associates PLLC; Gary M. Nath; Gregory B. Kang

(57) ABSTRACT

In a liquid crystal display, a metal layer forms a first light blocking layer having an opening that is shifted from gaps between adjacent reflective electrodes. Accordingly, light entering the gaps is blocked by the metal layer and does not directly reach lower layers. Between the reverses of the reflective electrodes and the surface of the light blocking layer made of the metal layer, light may be reflected multiple times and may leak through the opening of the light blocking layer toward lower layers than the metal layer. Such leakage of light is blocked by wiring regions that cover transistor diffusion regions, respectively. As a result, light is substantially completely blocked before reaching the diffusion regions, i.e., photosensitive regions of first and second transistors.

3 Claims, 13 Drawing Sheets

LIQUID CRYSTAL DISPLAY

BACKGROUND OF THE INVENTION

1. Field of the Invention

The present invention relates to a liquid crystal display, and particularly, to an active matrix liquid crystal display suitable for a projection display of high resolution, high luminance, and high quality.

2. Description of Related Art

In recent years, developments in the technologies of computers, communication, broadcasting, information storage media, and the like are boosting demand for large-screen, high-resolution displays. To meet the demand, projection LCDs (liquid crystal displays) have been introduced. The projection LCDs are largely classified into transmissive LCDs and reflective LCDs.

The transmissive LCD employs a liquid crystal panel having a transmissive insulating substrate on which pixels are arranged in a matrix with each pixel consisting of a thin-film transistor and a transparent electrode. Liquid crystal in each pixel modulates light transmitted through the liquid crystal panel, to display an image. The transmissive LCD has a merit that it may have a relatively simple optical system to project light. The transmissive LCD, however, has a problem that, when the panel is miniaturized to increase a pixel concentration, the ratio of a transistor/wiring area to a pixel area increases to decrease a numerical aperture. Another disadvantage thereof is that the aperture structure of a pixel is clearly displayed on a projected image to deteriorate smoothness along the border of an image, in particular, a natural image.

On the other hand, the reflective LCD employs a reflective electrode for each pixel and entirely arranges transistors and wiring on a layer under the reflective electrode, to realize a high pixel concentration without lowering a numerical aperture. In addition, the reflective LCD can drastically reduce the intervals of reflective electrodes of pixels to 0.3 to 0.6 $\mu$m, to make the aperture structure of each pixel inconspicuous and realize smooth images. Accordingly, the reflective LCD having miniaturizing and high-resolution capabilities is appropriate for a high-resolution projection display.

With reference to FIGS. 1 to 3, the basic structure of a reflective LCD according to a related art will be explained. FIG. 1 is a circuit diagram showing a drive circuit formed on a drive circuit substrate in the reflective LCD according to the related art. In FIG. 1, a horizontal scan circuit 1 consists of a group of sampling switches (not shown) to be turned on and off in response to outputs of shift register circuits and shift registers. The horizontal scan circuit 1 receives a horizontal synchronous signal Hst, a clock signal Hck, and a display signal Video and sequentially samples and supplies the display signal to m (an integer greater than 2) signal electrodes D1 to Dm.

A vertical scan circuit 2 consists of shift register circuits, receives a vertical synchronous signal Vst and a clock signal Vck, and sequentially supplies a select signal to n (an integer greater than 2) select signal electrodes G1 to Gn at intervals of horizontal image scan periods. The signal electrodes D1 to Dm and select signal electrodes G1 to Gn orthogonally intersect each other, and at the intersections thereof, "m×n" pixel circuits $3_{11}$ to $3_{mn}$ are formed.

The pixel circuits $3_{11}$ to $3_{mn}$ have an identical structure, and therefore, the pixel circuit $3_{11}$ will be explained as a representative. The pixel circuit $3_{11}$ consists of a switching MOS transistor Tr, a signal storage capacitor Cs, and a reflective electrode. A first main terminal (drain) of the switching MOS transistor Tr is connected to the signal electrode D1, and a second main terminal (source) of the transistor Tr is connected to the reflective electrode and an ungrounded terminal of the capacitor Cs. A control terminal (gate) of the transistor Tr is connected to a select signal electrode G1. The reflective electrode faces a liquid crystal material layer LC, which faces a transparent substrate on which a common electrode is formed.

The vertical scan circuit 2 supplies a select signal to the control terminal of the switching MOS transistor Tr of the pixel circuit. Switching MOS transistors in the same row are simultaneously turned on at each horizontal period, and the horizontal scan circuit 1 sequentially outputs a display signal to the signal electrodes D1 to Dm so that the capacitors Cs of pixel circuits in the selected row may store the display signals. A display signal voltage written in the capacitor Cs is stored therein during an unselected period up to the next vertical scan period in which a new signal is written into the capacitor Cs. The stored display signal voltage drives the corresponding liquid crystal layer.

The reflective LCD does not require the drive circuit substrate to be transparent, and therefore, can employ a standard semiconductor substrate, typically a silicon substrate. The silicon substrate is suitable to form semiconductor elements such as transistors of good quality in connection with, for example, an OFF leak characteristic and a current-voltage characteristic. Accordingly, not only the pixel circuits $3_{11}$ to $3_{mn}$ but also peripheral drive circuits such as the horizontal scan circuit 1 and vertical scan circuit 2 can easily be formed on the same silicon substrate.

FIGS. 2 and 3 are schematic plan and sectional views showing the structure of a typical pixel circuit in a reflective LCD according to a related art. In FIG. 3, a silicon substrate 11 forms a well 100 on which a transistor region 15 and a storage capacitor region 16 are formed. Pixel transistors and capacitors are separated from one another with a field oxide film 112. A transistor control electrode (gate) 102 and a storage capacitor electrode 105 are formed in a polysilicon wiring layer, thereby forming a MIS structure with $SiO_2$ as an insulating layer in the semiconductor substrate.

A signal electrode 101 is formed in a first metal layer that is formed on an insulating layer formed on the polysilicon layer. The signal electrode 101 is electrically connected to a drain diffusion region 103d of the transistor through a contact hole. The transistor has another terminal, i.e., a source diffusion region 103s that is connected to wiring 104 formed in the first metal layer. The wiring 104 is connected to the storage capacitor electrode 105. On the semiconductor substrate side of the storage capacitor region 16, a high-concentration diffusion layer is formed and connected to common wiring 111 formed in the first metal layer.

As shown in FIGS. 2 and 3, the wiring 104 in the first metal layer is so formed to completely cover the source diffusion region 103s of the transistor. Like this example, covering the source diffusion region 103s of the transistor with the wiring 104 blocks leakage of light, to prevent the generation of photocarriers in the semiconductor structure formed in the source well and stabilize signal storing and displaying characteristics even under strong light irradiation.

To secure sufficient light resistance against very strong light irradiation, the above-mentioned example forms a light blocking metal layer 106 in the metal layers above the first metal layer and below a top layer where the reflective electrodes are formed. The light blocking layer 106 has an opening 107 to make the reflective electrode 108 in the top layer contact with the source wiring 104 of the transistor. Through a contact arranged in the opening 107, the source wiring 104 of the transistor is connected to the reflective electrode 108. On the surface and reverse of the light blocking layer 106 and/or on the reverse of the reflective electrode 108, light absorbing layers may be formed, if required, to suppress multiple reflection of light on the metal layers.

On the surface of the reflective electrodes 108 in the semiconductor substrate 10 and on the reverse of the common electrode 13 formed in the transparent substrate 12, orientation layers 152a and 152b are formed respectively to orientate initial molecule arrangement of a liquid crystal material 151 in a predetermined direction. The liquid crystal material 151 is filled and sealed between the two substrates, to modulate the state of incident light in response to a signal voltage applied from the reflective electrodes 108.

An example of a liquid crystal display mode suitable for the reflective LCD will be explained. Such a suitable mode is a field effect double refraction mode. FIGS. 4 and 5 show an example of normally-black-indicating liquid crystal with negative dielectric anisotropy and an initial orientation substantially perpendicular to substrates. In FIG. 4, when no voltage is applied, liquid crystal molecules M are orientated substantially perpendicular to the substrates E1 and E2 and are slightly inclined in a predetermined direction. The reason why the predetermined inclination is given for the initial orientation is to control the liquid crystal molecules such that they may collectively incline in a predetermined direction when a voltage is applied thereto. The orientation films for orientating the liquid crystal molecules may be formed by, for example, an $SiO_2$ oblique vapor deposition technique.

According to this example, a polarization beam splitter PBS provides a linearly-polarized incident beam P1, and no double refraction occurs on the beam P1. Accordingly, a reflected output beam P3 from a reflective electrode is a linearly-polarized beam having the same polarization direction as that of the incident beam PI. When passing through the polarization beam splitter PBS, the output beam P3 is reflected toward a light source as indicated with "PO" to display black on a projection screen.

On the other hand, in FIG. 5, a voltage V is applied to the liquid crystal molecules. The liquid crystal molecules M incline together in a given direction with respect to the substrates. Due to double refraction based on a refractive index difference between the long and short axes of the liquid crystal molecules M, a phase difference relative to the orthogonal polarization components of a beam changes. As a result, the polarized state of an output beam changes into an elliptical polarization, a circular polarization, or a linear polarization orthogonal to the incident beam, depending upon a retardation value with parameters including the inclination of the liquid crystal molecules determined by the applied voltage, the total length of an optical path corresponding to a liquid crystal gap, and the wavelength of an incident beam.

The polarized beam component (P3) orthogonal to the incident beam again enters the polarization beam splitter PBS, transmits through the PBS, exits toward a projection lens (PO), and shows a color between gray and white depending on the voltage applied to the reflective electrode in each pixel. The liquid crystal display mode of this example is a normally-black mode that displays black when no voltage is applied. Displaying black in the normally-black mode is free from the influence of the double refraction effect of liquid crystal, has no wavelength dependence, and involves a small signal voltage level. This mode, therefore, advantageously provides a high-contrast displaying capability.

Another example of a display mode based on the field effect double refraction is a reflective TN mode. The reflective TN mode employs a liquid crystal material having positive dielectric anisotropy and arranged between two substrates. The liquid crystals are initially orientated substantially in parallel with one another, and the liquid crystals on the substrates are twisted relative to each other. When a voltage is applied, the liquid crystal molecules are orientated in the direction of an electric field to realize a normally-white display.

The reflective LCD of the related art with the basic configuration and structure mentioned above is characterized by a capability of easily coping with high-density, high-resolution pixels. The reflective LCD, therefore, is expected for application to large-screen, high-resolution projection displays. The reflective LCD according to the related art, however, has a problem that it requires, due to its liquid crystal driving voltage characteristic, a high voltage of about 10 V to 15 V as an operating voltage and a withstand voltage for drive circuits including semiconductor elements formed on a drive circuit substrate.

In particular, a high-resolution LCD must employ smaller transistors and finer wiring rules for elements formed on a drive circuit substrate. If based on the conventional driving voltage, it is hardly possible to reduce the size of a transistor structure due to the high withstand voltage, and therefore, it is difficult to achieve high resolution. In addition, securing the high withstand voltage needs special semiconductor manufacturing processes that may not allow the full utilization of advanced fine technologies related to semiconductor designing and processing rules.

Reducing the size of a display panel with the use of high-resolution, fine pixels results in increasing the energy of incident light per unit area and allowing leakage of light passing through gaps between reflective electrodes to easily reach semiconductor main parts. An important task is, therefore, to realize a structure having an excellent light blocking capability.

SUMMARY OF THE INVENTION

In consideration of the above, an object of the present invention is to provide an LCD structure having a sufficient light blocking capability and light resistance to cope with high-luminance, large-screen projection, operable with a reduced drive voltage, and suitable for finer pixels.

In order to accomplish the object, a first aspect of the present invention provides an LCD having a drive circuit substrate on which a plurality of pixel circuits are arranged in a matrix, a transparent substrate on which a common electrode is formed, and a liquid crystal material held between the drive circuit substrate and the transparent substrate. Each of the pixel circuits includes a reflective electrode arranged to face the common electrode, a first switching element to transfer a signal when turned on, a second switching element to transfer a signal when turned on, a first capacitor having a first electrode thereof connected to a node between the first switching element and the reflective electrode, to store a signal input through the first switching element when the first switching element is in an ON state and supply the signal to the reflective electrode, and a second capacitor having a first electrode thereof connected to a common node of the first and second switching elements, to store an external signal input through the second switching element when the second switching element is in an ON state. Second electrodes of the first and second capacitors of all pixel circuits are commonly connected.

The drive circuit substrate includes a metal layer formed under reflective electrodes and having an opening, the position of the opening being shifted along the surface of the drive circuit substrate to avoid the positions of gaps between the reflective electrodes of adjacent pixel circuits and block light.

The drive circuit substrate also includes a wiring layer formed under the metal layer and having first wiring that covers and is electrically connected to a first diffusion region corresponding to the common node of the first and second switching elements and second wiring that covers and is electrically connected to a second diffusion region corresponding to an output part of the first switching element, the first and second wiring being divided and electrically isolated from each other.

The position of a gap between the first and second wiring dividedly formed in the wiring layer is shifted along the surface of the drive circuit substrate to avoid the position of the opening formed in the metal layer.

According to the first aspect, incident light passing through gaps between the reflective electrodes of the adjacent pixel circuits is blocked by the metal layer and does not directly reach lower layers. Against light that may pass through the opening of the metal layer to lower layers due to multiple reflection between the reverses of the reflective electrodes and the surface of the metal layer, the wiring layer blocks such light so that substantially no light may reach the first and second diffusion regions that are photosensitive regions of the first and second switching elements.

A second aspect of the present invention provides an LCD having a drive circuit substrate on which a plurality of pixel circuits are arranged in a matrix, a transparent substrate on which a common electrode is formed, and a liquid crystal material held between the drive circuit substrate and the transparent substrate. Each of the pixel circuits includes a reflective electrode arranged to face the common electrode, a first switching element to transfer a signal when turned on, a second switching element to transfer a signal when turned on, a first capacitor having a first electrode thereof connected to a node between the first switching element and the reflective electrode, to store a signal input through the first switching element when the first switching element is in an ON state and supply the signal to the reflective electrode, and a second capacitor having a first electrode thereof connected to a common node of the first and second switching elements, to store an external signal input through the second switching element when the second switching element is in an ON state. Second electrodes of the first and second capacitors of all pixel circuits are commonly connected.

The drive circuit substrate includes a metal layer formed under reflective electrodes and having an opening, the position of the opening being shifted along the surface of the drive circuit substrate to avoid the positions of gaps between the reflective electrodes of adjacent pixel circuits and block light.

The drive circuit substrate also includes first and second contact layers formed under the metal layer. The first contact layer is formed on a first diffusion region corresponding to the common node of the first and second switching elements. The second contact layer is formed on a second diffusion region corresponding to an output part of the first switching element. The first and second contact layers are separately and directly formed on the first and second diffusion regions according to a salicide technique.

According to the second aspect, incident light passing through gaps between the reflective electrodes of the adjacent pixel circuits is blocked by the metal layer and does not directly reach lower layers. Against light that may pass through the opening of the metal layer to lower layers due to multiple reflection between the reverses of the reflective electrodes and the surface of the metal layer, the first and second contact layers are directly formed on the first and second diffusion regions to prevent such light from entering the first and second diffusion regions.

A third aspect of the present invention forms the first capacitor of any one of the first and second aspects with the reflective electrode, the metal layer, and an insulating layer formed between the reflective electrode and the metal layer.

According to the third aspect, the reflective electrode and the metal layer are effectively utilized to form the first capacitor.

A fourth aspect of the present invention provides the LCD of any one of the first to second aspects with a signal supply unit. The signal supply unit supplies display signals to the reflective electrodes through the first switching elements, the polarity of the display signals being inverted every vertical scan period, a level range of each of the display signals for a positive polarity period and that for a negative polarity period overlapping such that a black display signal level and white display signal level in the positive polarity period correspond to a white display signal level and black display signal level in the negative polarity period. In synchronization with the timing of supplying the display signals to the reflective electrodes, the signal supply unit supplies an alternating current signal to the common electrode. The polarity of the alternating current signal is opposite to that of the display signals and the level of the alternating current signal is greater than the amplitude of a black display signal.

According to the fourth aspect, display signals are simultaneously supplied to the reflective electrodes of all pixel circuits by simultaneously turning on the first switching elements. Accordingly, the switching of the polarity of the alternating current signal and the switching of the polarity of the display signals can be agreed with each other in all pixel circuits.

The nature, principle and utility of the invention will become more apparent from the following detailed description when read in conjunction with the accompanying drawings.

DETAILED DESCRIPTION OF EMBODIMENTS

Figure 1:
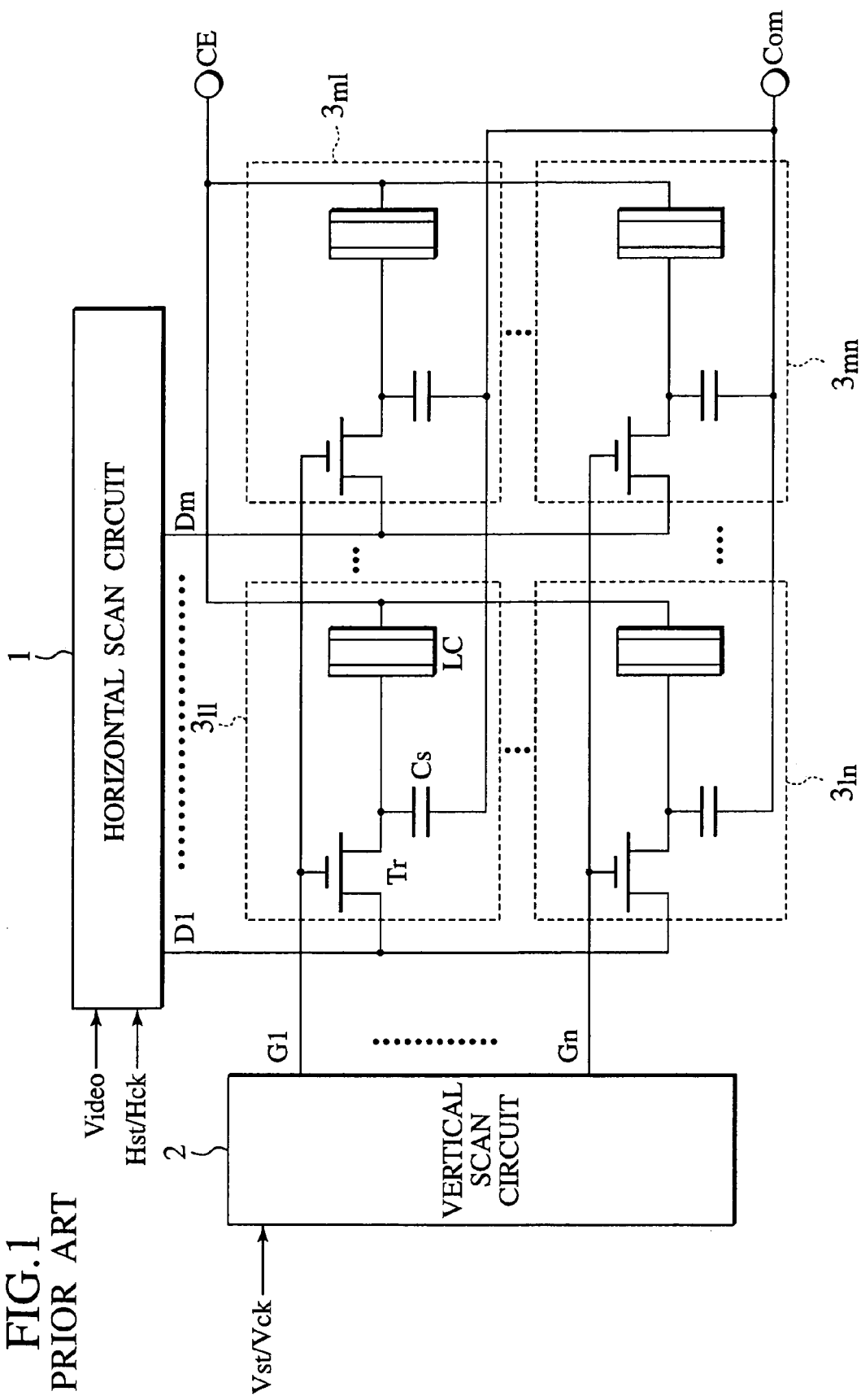
FIG. 1 is a circuit diagram showing an example of a drive circuit formed on a drive circuit substrate of an LCD according to a related art.
Figure 2:
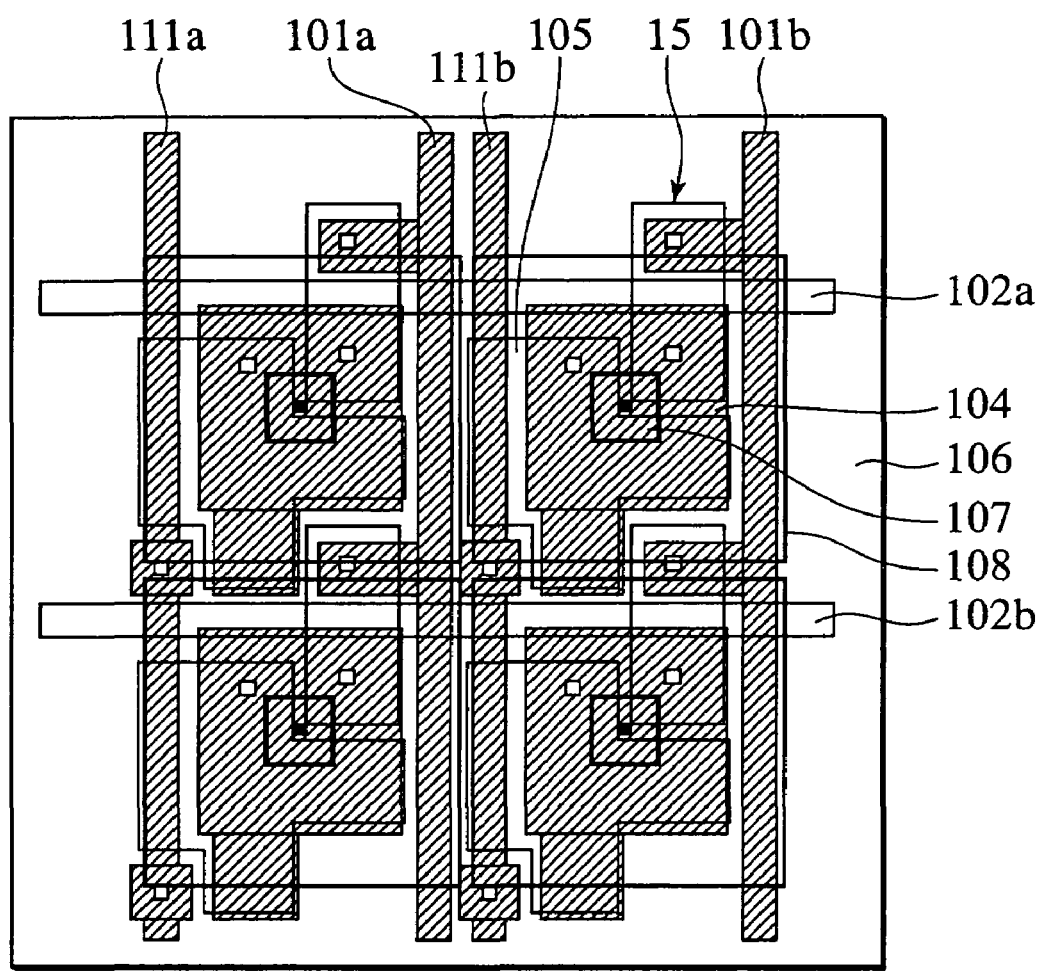
FIG. 2 is a schematic plan view showing the structure of a typical pixel circuit in an LCD according to a related art.
Figure 3:
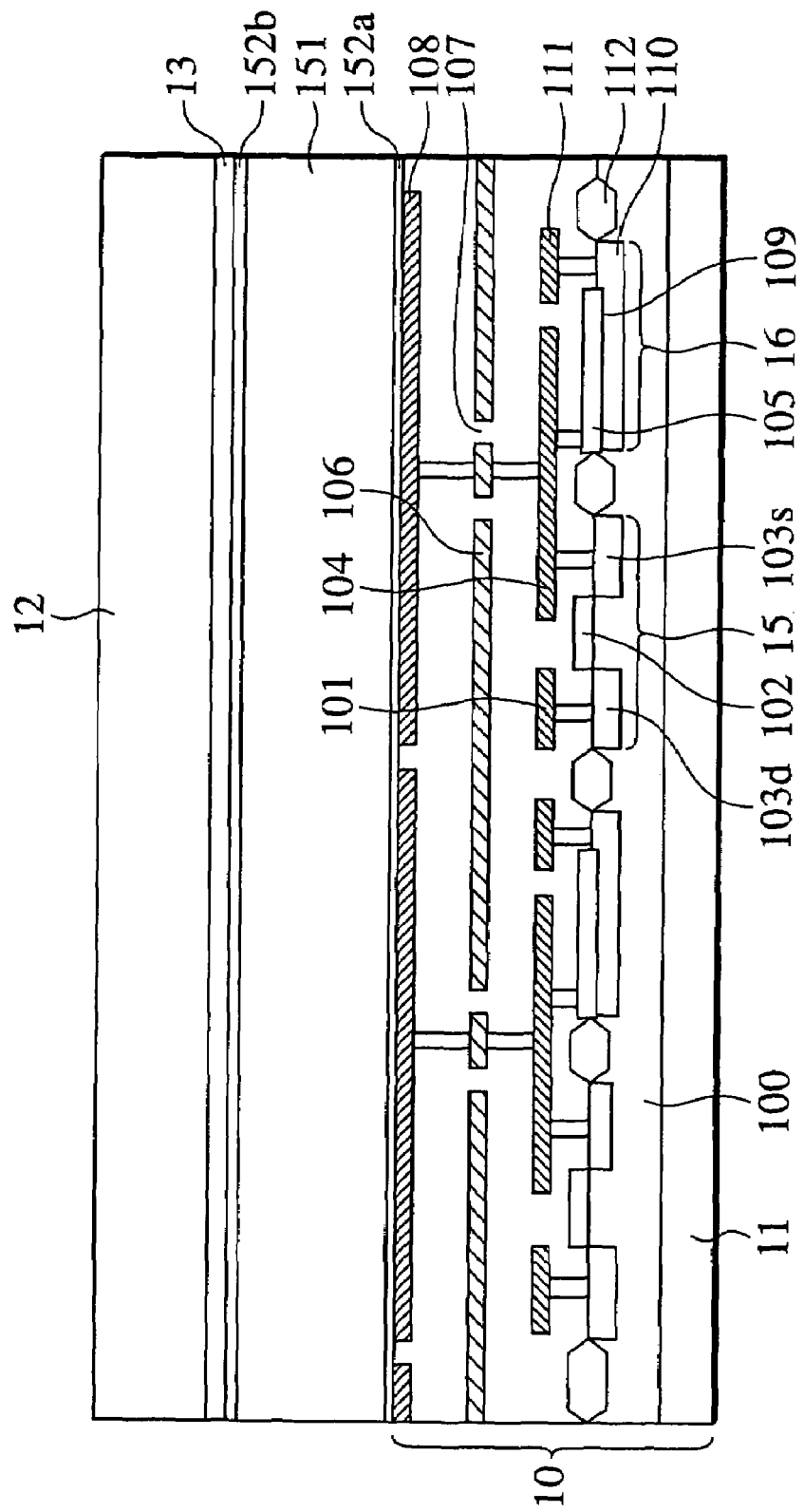
FIG. 3 is a schematic sectional view showing the structure of the pixel circuit of FIG. 2.
Figure 4:
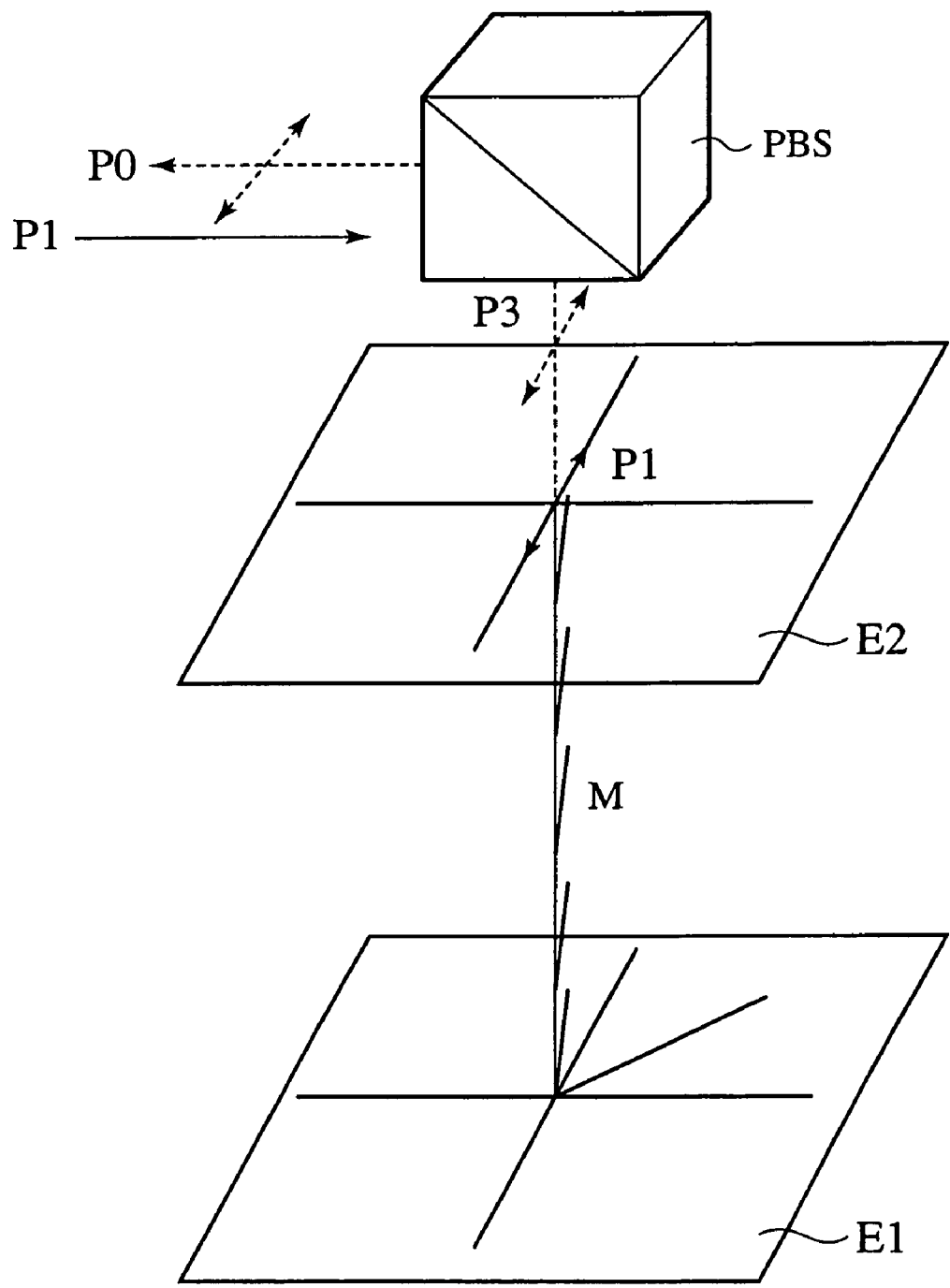
FIG. 4 is a model view showing an operation mode of liquid crystals in an LCD according to a related art.
Figure 5:
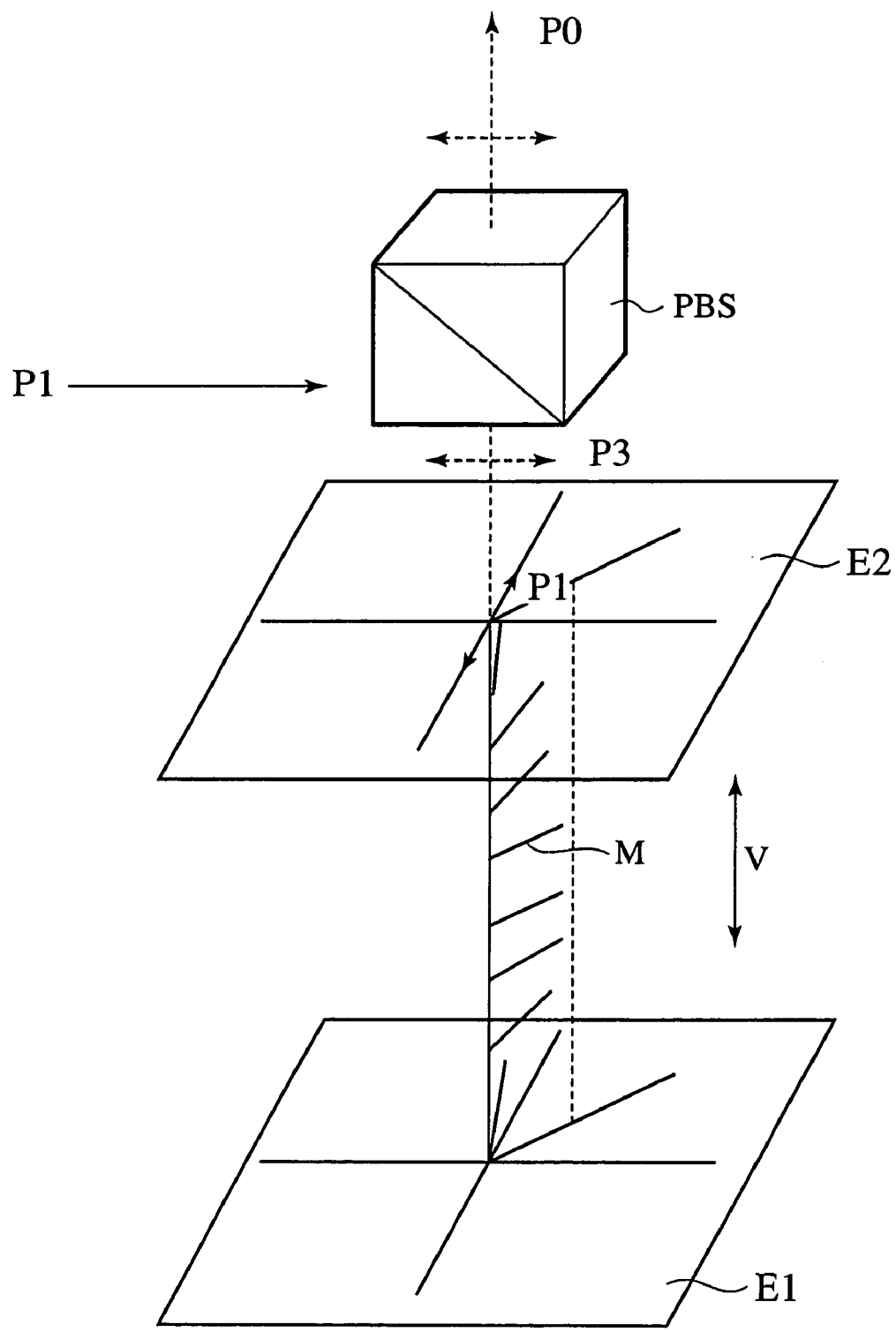
FIG. 5 is a model view showing an operation mode of liquid crystals according to the related art of FIG. 4.
Figure 6:
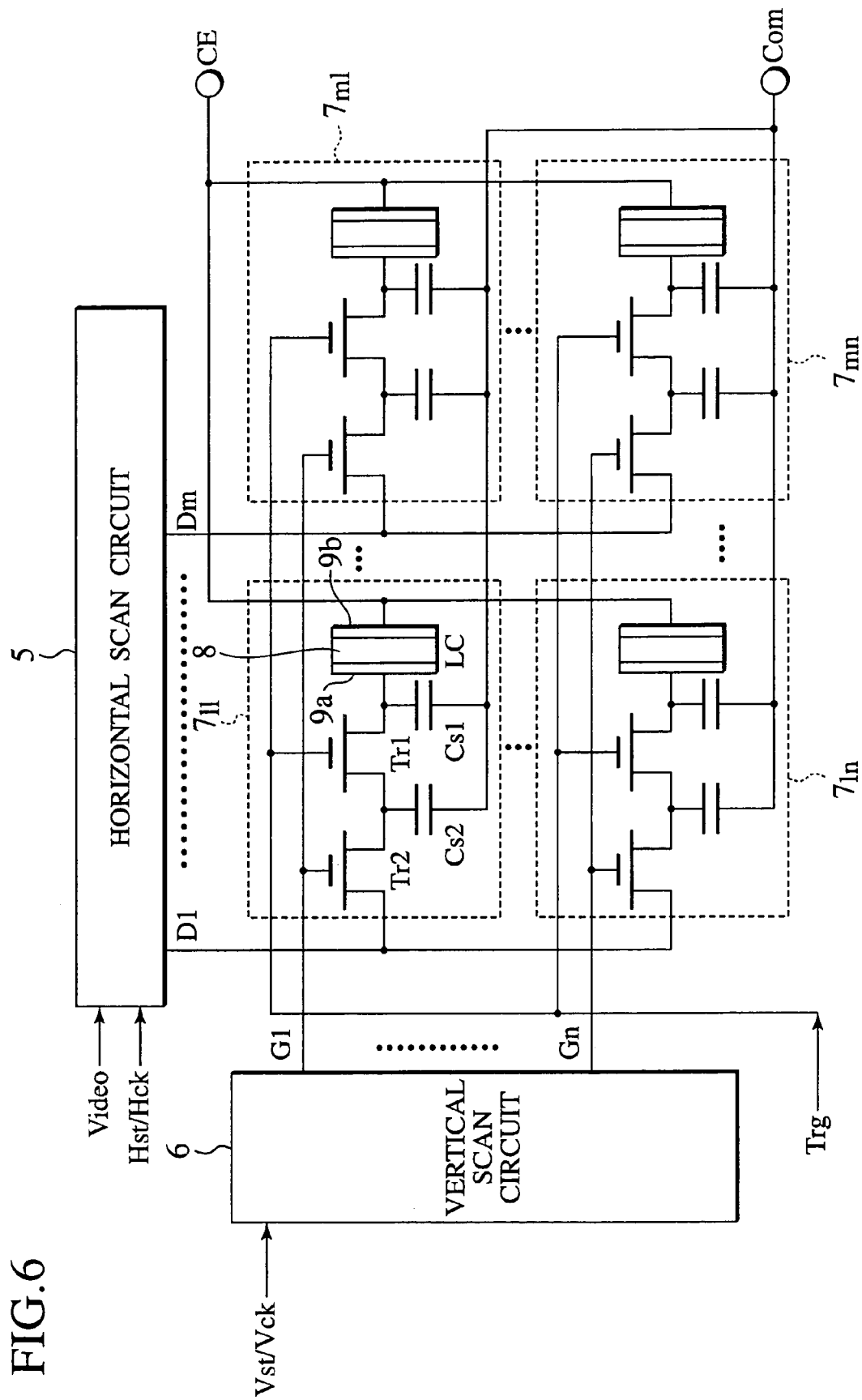
FIG. 6 is a circuit diagram showing a drive circuit formed on a drive circuit substrate of an embodiment of an LCD according to the present invention.

Embodiments of the present invention will be explained with reference to the accompanying drawings. FIG. 6 is a circuit diagram showing a drive circuit formed on a drive circuit substrate of an embodiment of an LCD according to the present invention. In FIG. 6, a horizontal scan circuit 5 consists of shift register circuits and a group of sampling switches (not shown) to be turned on and off in response to outputs from shift registers. The horizontal scan circuit 5 receives a horizontal synchronous signal Hst, clock signal Hck, and display signal Video, sequentially samples the display signal, and sequentially supplies the sampled signal to m signal electrodes D1 to Dm.

A vertical scan circuit 6 consists of shift register circuits to receive a vertical synchronous signal Vst and clock signal Vck, sequentially switch a select signal every horizontal period of an image, and sequentially supply the select signal to n select signal electrodes G1 to Gn. The signal electrodes D1 to Dm and select signal electrodes G1 to Gn are arranged to orthogonally intersect each other. At "m×n" intersections of the electrodes D1 to Dm and G1 to Gn, pixel circuits $7_{11}$ to $7_{mn}$ are formed.

The pixel circuits $7_{11}$ to $7_{mn}$ have an identical structure, and therefore, the structure of the pixel circuit $7_{11}$ will be explained as a representative. The pixel circuit $7_{11}$ includes a first semiconductor element, i.e., a switching MOS transistor Tr1, a second semiconductor element, i.e., a switching MOS transistor Tr2, two signal storage capacitors Cs1 and Cs2, and a liquid crystal display element 8. The liquid crystal display element 8 includes a reflective electrode 9a, a common electrode 9b (CE) facing the reflective electrode 9a, and a liquid crystal display material layer LC sealed between the electrodes 9a and 9b. The common electrode 9b is formed on a transparent substrate.

The switching MOS transistor Tr1 has a first main terminal (source) connected to the reflective electrode 9a and a first end of the first capacitor Cs1. The transistor Tr1 also has a second main terminal (drain) connected to a first main terminal (source) of the switching MOS transistor Tr2 and a first end of the second capacitor Cs2. Control terminals (gates) of the switching MOS transistors Tr1 of all pixel circuits are commonly connected to a control signal line to be simultaneously supplied with a control signal Trg.

A second main terminal (drain) of the switching MOS transistor Tr2 is connected to the signal electrode D1 in a first column, and a control terminal (gate) of the transistor Tr2 is connected to the select signal electrode G1 in a first row. The drains of the MOS transistors Tr2 in n pixel circuits $7_{i1}$ to $7_{in}$ in the "i"th column ($1 \leq i \leq m$) are commonly connected to the signal electrode Di. The gates of the MOS transistors Tr2 in m pixel circuits $7_{1j}$ to $7_{mj}$ in the "j"th row ($1 \leq j \leq n$) are commonly connected to the signal electrode Gj.

Second ends of the storage capacitors Cs1 and Cs2 in all pixels are commonly connected to a common terminal Com on a silicon substrate. To the common terminal Com, an external reference DC voltage is biased.

An operation of the embodiment will briefly be explained. The vertical scan circuit 6 supplies a select signal to the control terminals (gates) of the switching MOS transistors Tr2 in a selected row in such a way as to collectively turn on the switching MOS transistors Tr2 of m pixel circuits row by row every horizontal period. For the selected pixel circuits, the horizontal scan circuit 5 writes display signals sequentially output to the signal electrodes D1 to Dm into the capacitors Cs2 through the drains and sources of the MOS transistors Tr2 that are ON in the corresponding pixel circuits.

The display signal voltages written in the capacitors Cs2 are stored therein during an unselected period up to the next vertical scan period in which new signals are supplied. During the unselected period, the control terminals (gates) of the switching MOS transistors Tr1, i.e., the first semiconductor elements receive a control signal Trg having a voltage level to keep the transistors Tr1 in an OFF state.

When display signals for an entire frame are written into all capacitors Cs2 from the first row to the last row, a control signal Trg having a voltage level to turn on the switching MOS transistors Tr1 is supplied to the control terminals of the transistors Tr1, i.e., the first semiconductor elements of all pixel circuits. As a result, the display signal voltages stored in the capacitors Cs2 are simultaneously transferred to the reflective electrodes 9a of all pixel circuits through the drains and sources of the transistors Tr1 that are ON. At the same time, the signal voltages applied to the reflective electrodes 9a are stored in the first capacitors Cs1 of all pixel circuits, respectively.

Upon the completion of the signal transfer to the reflective electrodes 9a of all pixel circuits, the control signal Trg is again set to turn off the switching MOS transistors Tr1, and a next frame write operation starts. During the scanning of the next frame, the switching MOS transistors Tr1 are kept in the OFF state, and during this period, the signal voltages for the reflective electrodes 9a are stored in the first capacitors Cs1. Difference voltages between the voltages stored in the first capacitors Cs1, i.e., the signal voltages for the reflective electrodes 9a and the voltage applied to the common electrode CE (9b) on the transparent substrate are applied to the liquid crystal materials LC.

Figure 7:
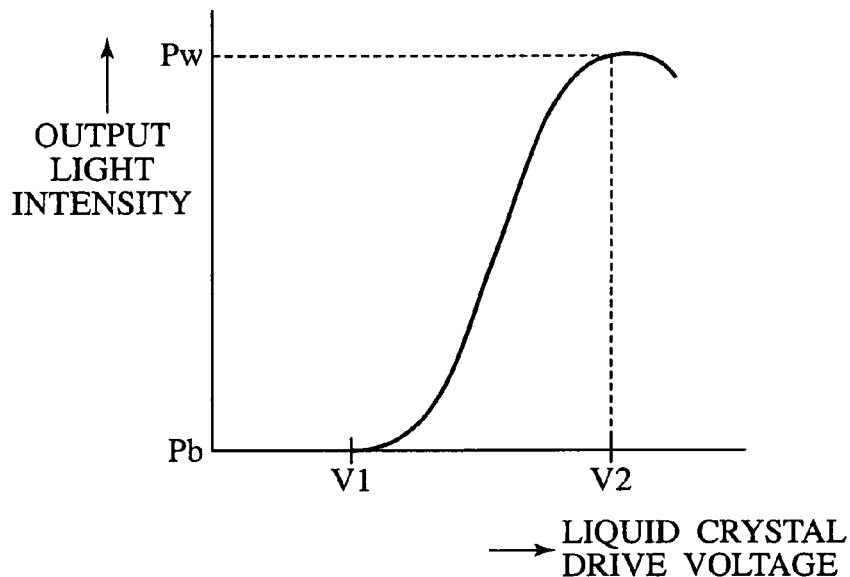
FIG. 7 is a graph showing a liquid crystal drive voltage-output light intensity (transmittance) characteristic according to an embodiment of the present invention.

FIG. 7 shows an example of a liquid crystal drive voltage-output light intensity (transmittance) characteristic according to an embodiment of the present invention. As explained with reference to the related art, a liquid crystal display mode suitable for a reflective LCD is the field effect double refraction mode that provides a normally-black or normally-white characteristic depending on dielectric anisotropy and initial orientation of liquid crystal molecules. The following explanation is made based on the normally-black characteristic.

In FIG. 7, a drive voltage V1 corresponds to black (output light intensity of Pb) on a display image, and a drive voltage V2 corresponds to white (output light intensity of Pw) on a display image. To prevent display image burn-in and material deterioration, liquid crystals are usually driven with an alternating voltage having symmetrical positive and negative voltage levels.

Figure 8A:
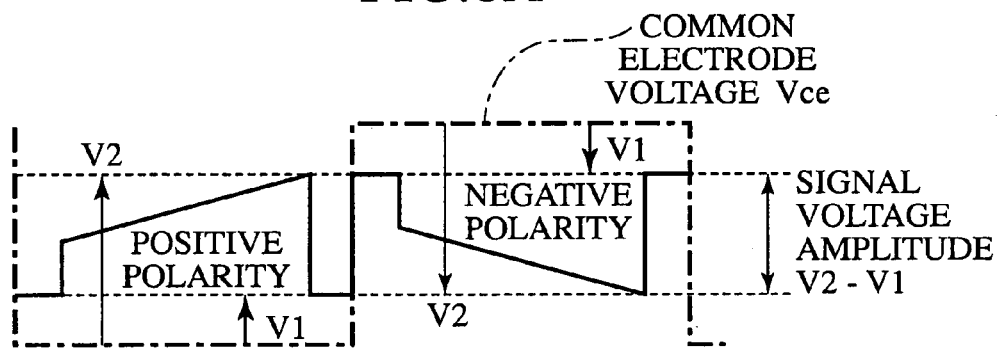
FIGS. 8A and 8B are graphs respectively showing a signal voltage in an LCD according to an embodiment of the present invention and a signal voltage in an LCD according to a related art.
Figure 8B:
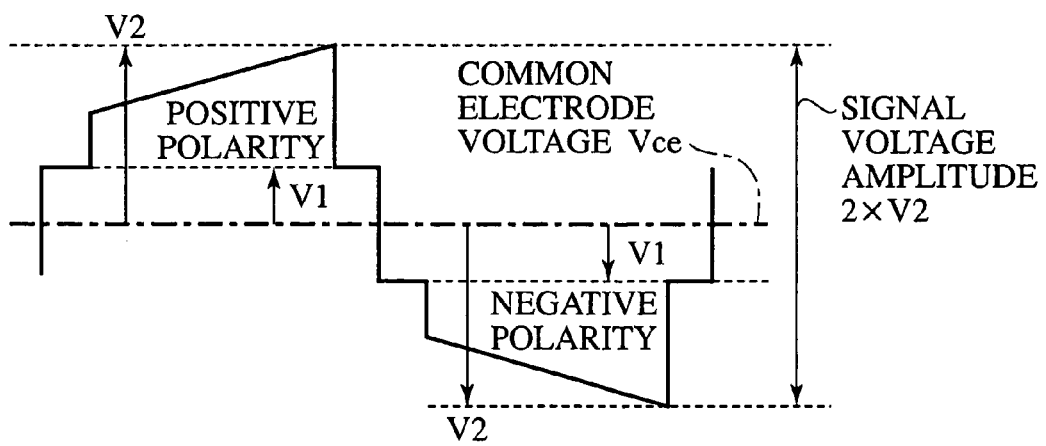

FIG. 8A shows signal voltages in an LCD according to an embodiment of the present invention, and FIG. 8B shows signal voltages in an LCD according to a related art. In FIG. 8B, a reference DC voltage Vce is applied to a common electrode on a transparent substrate, and relative to the reference voltage Vce, a signal having an amplitude representative of a level between black and white levels is applied to a reflective electrode on a drive circuit substrate. As a result, a maximum signal amplitude to be written in the reflective electrode in a drive circuit on the drive circuit substrate will be "2×V2" (V2 being the peak voltage shown in FIG. 7 to display white).

On the other hand, the LCD according to the embodiment of the present invention of FIG. 8A supplies a display signal having only a level between black and white levels to a reflective electrode on a drive circuit substrate. In addition, the embodiment substantially equalizes a positive black display voltage with a negative white display voltage, and a positive white display voltage with a negative black display voltage by overlapping the voltage ranges and levels of positive and negative display signals. As a result, a maximum signal amplitude to be applied to the reflective electrode will be "V2−V1." Further, an alternating voltage Vce is applied to the common electrode on the transparent substrate. The alternating voltage Vce has an amplitude that is greater by ±V1 than the amplitude of the black display voltage applied to the reflective electrode.

As is apparent from the explanation of the operation of the example of FIG. 6, the LCD according to the present invention simultaneously supplies signals to the reflective electrodes 9a of all pixel circuits $7_{11}$ to $7_{mn}$ by simultaneously turning on the first MOS transistors Tr1. It is possible, therefore, to make the polarity switching of the alternating voltage Vce coincide with the polarity switching of signal voltages applied to the reflective electrodes of all pixel circuits. Namely, the influence of write timing difference that occurs when writing display signals by scanning never takes effect, and therefore, the alternating common electrode voltage Vce can uniformly overlap liquid crystal drive voltages in all pixels.

In a test, a nematic liquid crystal material having negative dielectric anisotropy was orientated substantially vertically on each face of two electrode substrates, and liquid crystal cells of field effect double refraction mode and normally-black characteristic were actually produced with cell gaps of about 3 µm. On the liquid crystal cells, a drive voltage-light intensity characteristic like the one shown in FIG. 7 was measured, and the following typical data was obtained:

V1=about 2 (V): black display voltage (liquid crystal threshold voltage)

V2=about 4.5 (V): white display voltage (peak voltage)

According to the LCD driving technique of the related art, the amplitude of a signal voltage supplied to a reflective electrode is as follows:

$2 \times V2 = 9(V)$

On the other hand, the LCD driving technique according to an embodiment of the present invention supplies a signal voltage having only the following amplitude to a reflective electrode:

$V2 - V1 = 2.5(V)$

At the same time, the embodiment applies an alternating voltage Vce having an amplitude of 6.5 (V) to the common electrode facing the reflective electrode with the polarity of the voltage Vce being opposite to the polarity of the signal voltage applied to the reflective electrode. The signal voltage and alternating voltage Vce provide a drive voltage sufficient to drive liquid crystals.

The LCD structure and LCD driving technique according to the embodiments mentioned above can greatly reduce the amplitude of a final display signal voltage supplied to each reflective electrode in the drive circuit formed on the drive circuit substrate. As a result, the embodiments can reduce operation voltage and source voltage for the peripheral drive circuits of the LCD, such as the horizontal scan circuit 5 and vertical scan circuit 6, and the pixel circuits $7_{11}$ to $7_{mn}$.

Consequently, the embodiments need no special high-voltage-withstanding structures or special processes when producing LCD semiconductor elements and greatly relax limits on operation voltage and withstand voltage related to the design and manufacturing rules of semiconductor integrated circuits. The embodiments, therefore, can realize LCDs employing fine, high-density display panels.

The above explanation mainly relates to the basic structure and operation of a drive circuit of an LCD. As explained with reference to the problems to be solved by the present invention, it is necessary to secure sufficient light blocking capability and light resistance against irradiated incident light when realizing a high-luminance, large-screen projection LCD.

As is apparent from the explanation related to the basic structure and operation of the LCD drive circuit according to the present invention of FIG. 6, each of the pixel circuits $7_{11}$, to $7_{mn}$ has the first MOS transistor Tr1 to supply a signal to the reflective electrode 9a and the second MOS transistor Tr2 to be scanned. A signal voltage sent to the reflective electrode 9a through the MOS transistor Tr1 must be stored in the capacitor Cs1 during an OFF period of the MOS transistor Tr1. A write voltage from the horizontal scan circuit 5 and vertical scan circuit 6 to each of the pixel circuits $7_{11}$ to $7_{mn}$ nm must be stored in the capacitor Cs2 for a predetermined period during an OFF period of the second MOS transistor Tr2.

Each of the storing periods mentioned above is substantially equal to one vertical scan period, and variations in the stored voltage during the period greatly affect display characteristics. Accordingly, it is required to provide a new structure to suppress leakage of the stored voltage due to photocarriers and secure sufficient light resistance for a plurality of photosensitive parts and a plurality of signal storage operations in each of the pixel circuits $7_{11}$ to $7_{mn}$.

In order to meet the requirement, the present invention provides structures and means to secure sufficient light resistance for an LCD. The structure of a pixel of an LCD having such light resistance according to an embodiment of the present invention will be explained.

Figure 9:
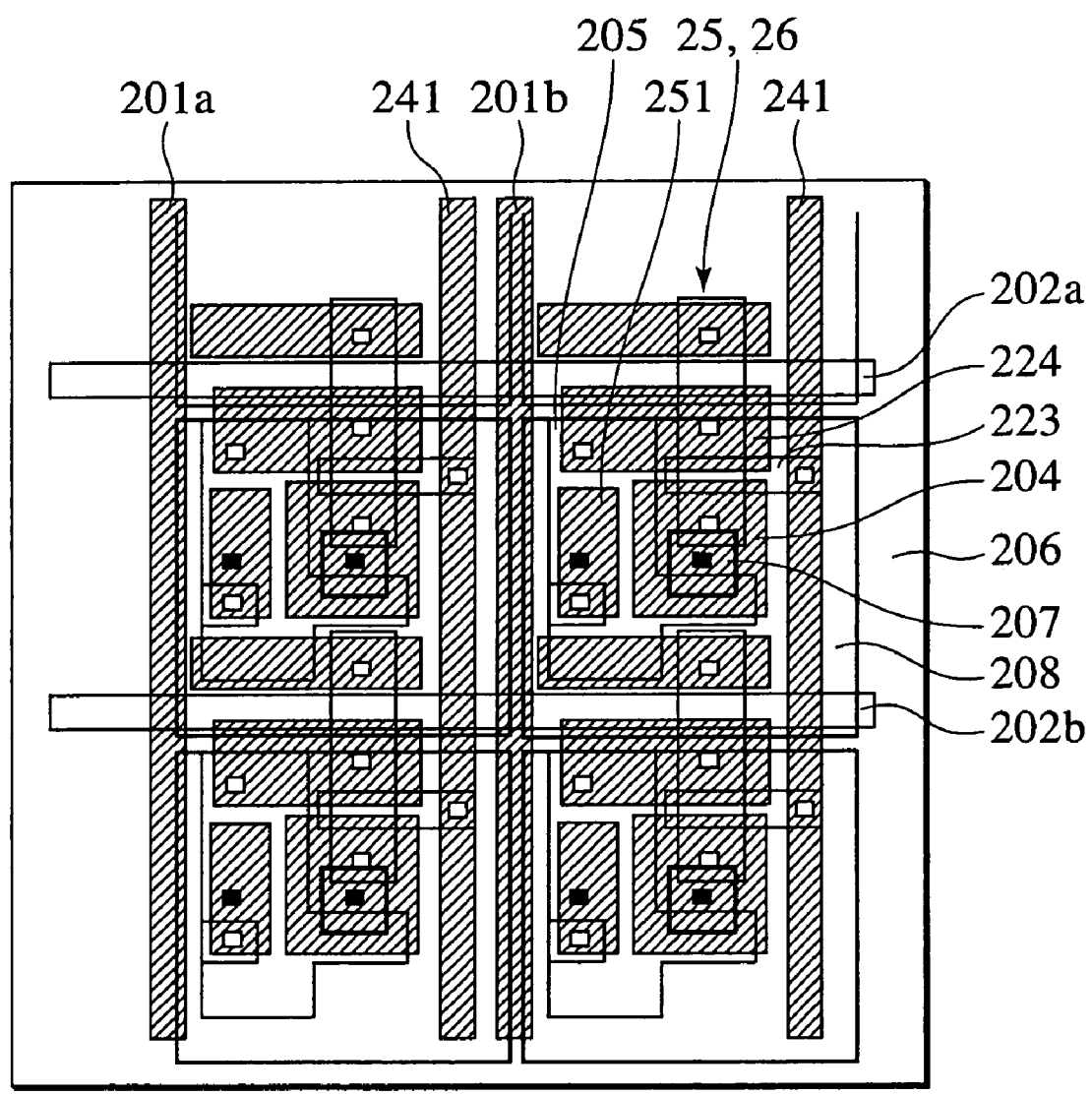
FIG. 9 is a schematic plan view showing the structure of a first embodiment of an LCD according to the present invention.
Figure 10:
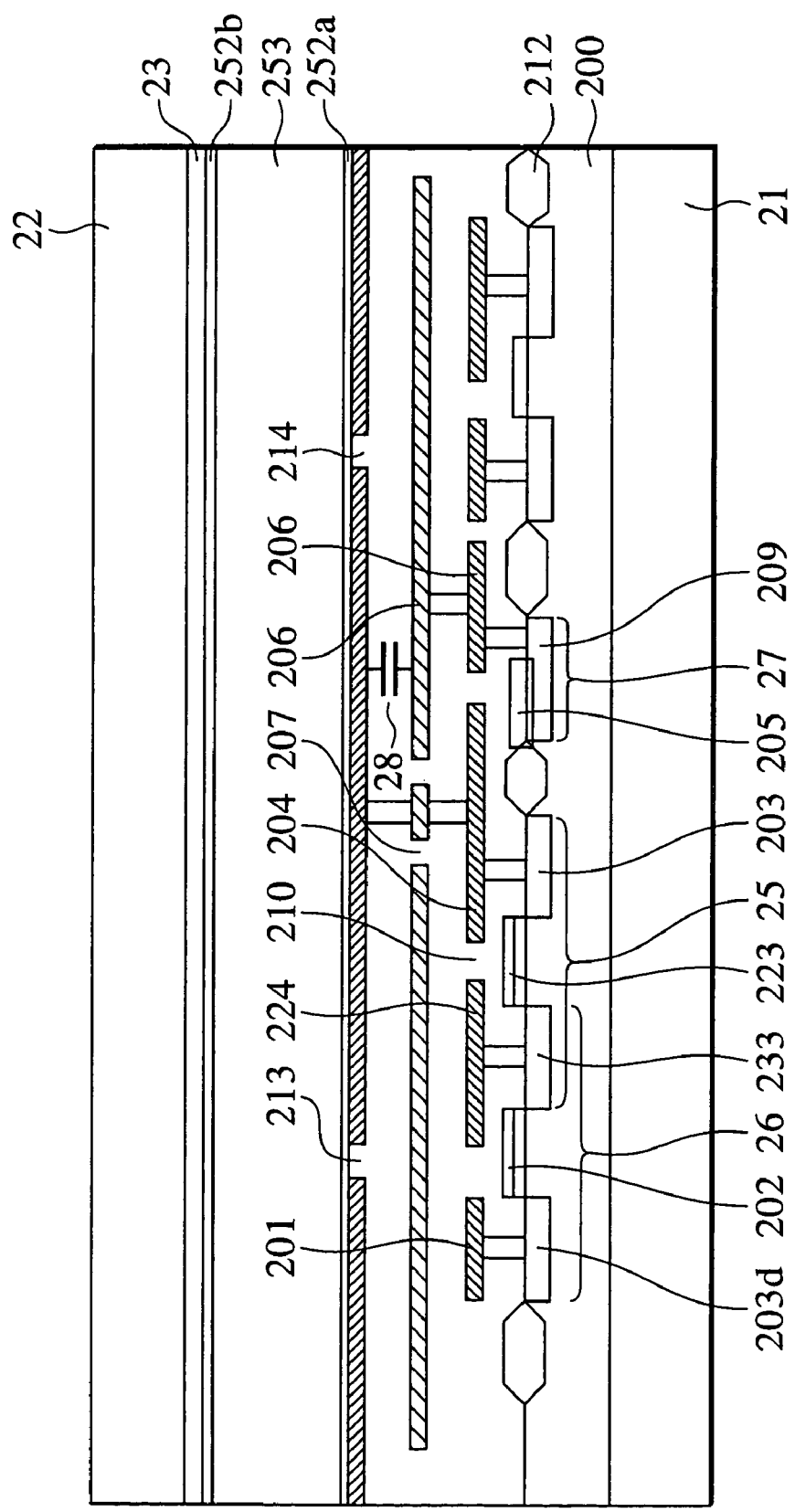
FIG. 10 is a schematic sectional view showing the structure of the embodiment of FIG. 9.

FIGS. 9 and 10 are schematic plan and sectional views showing the structure of a first embodiment of an LCD according to the present invention. In FIG. 10, a silicon substrate 21 forms a well 200 thereon. On the well 200, there are a first transistor 25 (corresponding to the transistor Tr1 of FIG. 6), a second transistor 26 (corresponding to the transistor Tr2 of FIG. 6), and a storage capacitor region 27 (corresponding to the second capacitor Cs2 of FIG. 6). In each pixel circuit, the first and second transistors 25 and 26 and storage capacitor region 27 are separated from one another with a field oxide film 212. A control electrode (gate) 223 of the first transistor 25 and a storage capacitor electrode 205 are formed in a polysilicon wiring layer, to form a MIS structure with an $SiO_2$ as an insulating layer in the semiconductor substrate.

A control electrode (gate) 202 of the second transistor 26 is also formed in the polysilicon layer, is horizontally extended, and is connected to an output terminal of a corresponding row of a vertical scan circuit (6 of FIG. 6). As shown in FIG. 9, the control electrode 223 of the first transistor 25 is connected to wiring 241 made of a first metal layer formed on an insulating layer that is formed on the polysilicon layer. The wiring 241 supplies a common timing signal (corresponding to the control signal Trg of FIG. 6) to the control electrodes 223 of all pixels. In FIG. 10, a signal electrode 201 (wiring 201*a* and 201*b* of FIG. 9, D1 to Dm of FIG. 6) is formed in the first metal layer and is electrically connected to a drain diffusion region 203*d* of the second transistor 26 through a contact hole.

A source diffusion region or a second terminal of the second transistor 26 and a drain diffusion region of the first transistor 25 form a common diffusion region 233 as shown in FIG. 10. To the diffusion region 233, wiring 224 formed in the first metal layer is connected. Although not shown in FIG. 10, the wiring 224 is connected to a first electrode 205 of the storage capacitor region 27 through a contact hole as shown in FIG. 9.

A second electrode of the storage capacitor region 27 is a high-concentration diffusion region 209 formed in the well 200. To the high-concentration diffusion region 209, wiring 251 of FIG. 9 formed in the first metal layer is connected. The second electrodes of the storage capacitor regions 27 of all pixel circuits are commonly connected to a second metal layer 206 formed on an insulating layer that is formed on the first metal layer. The storage capacitor region 27 corresponds to the capacitor Cs2 of FIG. 6 and is formed to properly store a signal voltage at a common node between the first and second transistors 25 and 26.

A source diffusion region 203 of the first transistor 25 is connected through a contact hole to a wiring region 204 formed in the first metal layer. Furhter, through the second metal layer 206 having an opening 207 shown in FIGS. 9 and 10, the source diffusion region 203 is connected to a reflective electrode 208 formed on a top layer. The reflective electrode 208, the second metal layer 206 having the opening 207, and an insulating layer between the reflective electrode 208 and the second metal layer 206 form a storage capacitor 28 (corresponding to the first capacitor Cs1 of FIG. 6) to store a signal voltage for the reflective electrode 208. The pixel circuits mentioned above are arranged in a matrix in a drive circuit substrate (the multilayer substrate from the silicon substrate 21 to the reflective electrode 208). On the surface of the reflective electrode 208 arranged at the uppermost in the drive circuit substrate, an orientation layer 252*a* is formed. On the reverse of a common electrode 23 formed on a transparent substrate 22, an orientation layer 252*b* is formed. The orientation layers 252*a* and 252*b* determine the initial orientation of liquid crystal molecules of a liquid crystal material 253. The liquid crystal material 253 is sealed between the drive circuit substrate and the transparent substrate 22, to modulate a state of incident light in response to a signal voltage at the reflective electrode 208.

The LCD according to this embodiment employs the structure of FIG. 10 to secure a light blocking capability. Namely, the wiring region 224 formed in the first metal layer covers the top of the diffusion region 233 serving as a common node of the first transistor 25 (Tr1) and second transistor 26 (Tr2). Further, the wiring region 204 that is formed separately from the wiring region 224 in the first metal layer covers the source diffusion region 203 serving as an output part of the first transistor 25 (Tr1). The wiring regions 204 and 224 form a second light blocking layer and are separately formed so that the regions 204 and 224 are electrically independent of each other.

In FIG. 10, the position of a gap 210 between the wiring regions 224 and 204 in the first metal layer, the position of the opening 207 formed in the second metal layer 206, and the positions of gaps 213 and 214 between the adjacent reflective electrodes 208 on the uppermost layer are shifted from one another. Namely, the positions of the gaps 213 and 214 formed between the reflective electrodes 208 of the adjacent pixel circuits, the position of the opening 207 in the second metal layer 206 serving as a first light blocking layer under the reflective electrodes 208, and the position of the gap 210 are shifted from one another along the surface of the drive circuit substrate, so that they do not overlap one another.

According to the structure of this embodiment, the opening 207 through the first light blocking layer made of the second metal layer 206 is shifted from the gaps 213 and 214 of the adjacent reflective electrodes 208. Consequently, light entering the gaps 213 and 214 of the adjacent reflective electrodes 208 is blocked by the second metal layer 206 and does not directly reach lower layers. In addition, light leaking to lower layers than the metal layer 206 through the opening 207 thereof due to multiple reflection between the reverses of the reflective electrodes 208 and the surface of the light blocking layer made of the second metal layer 206 is blocked by the wiring regions 224 and 204 that are separately formed in the first wiring layer to cover the transistor diffusion regions 233 and 203, respectively. As a result, light toward the photosensitive diffusion regions 233 and 203 of the first and second transistors 25 and 26 is substantially completely blocked before reaching the regions 233 and 203.

As means to reduce the influence of multiple reflection of light caused between the metal layers, it is possible to form a light absorbing layer made of, for example, titanium nitride (TiN) on the surface or reverse of each metal layer from.

Figure 11:
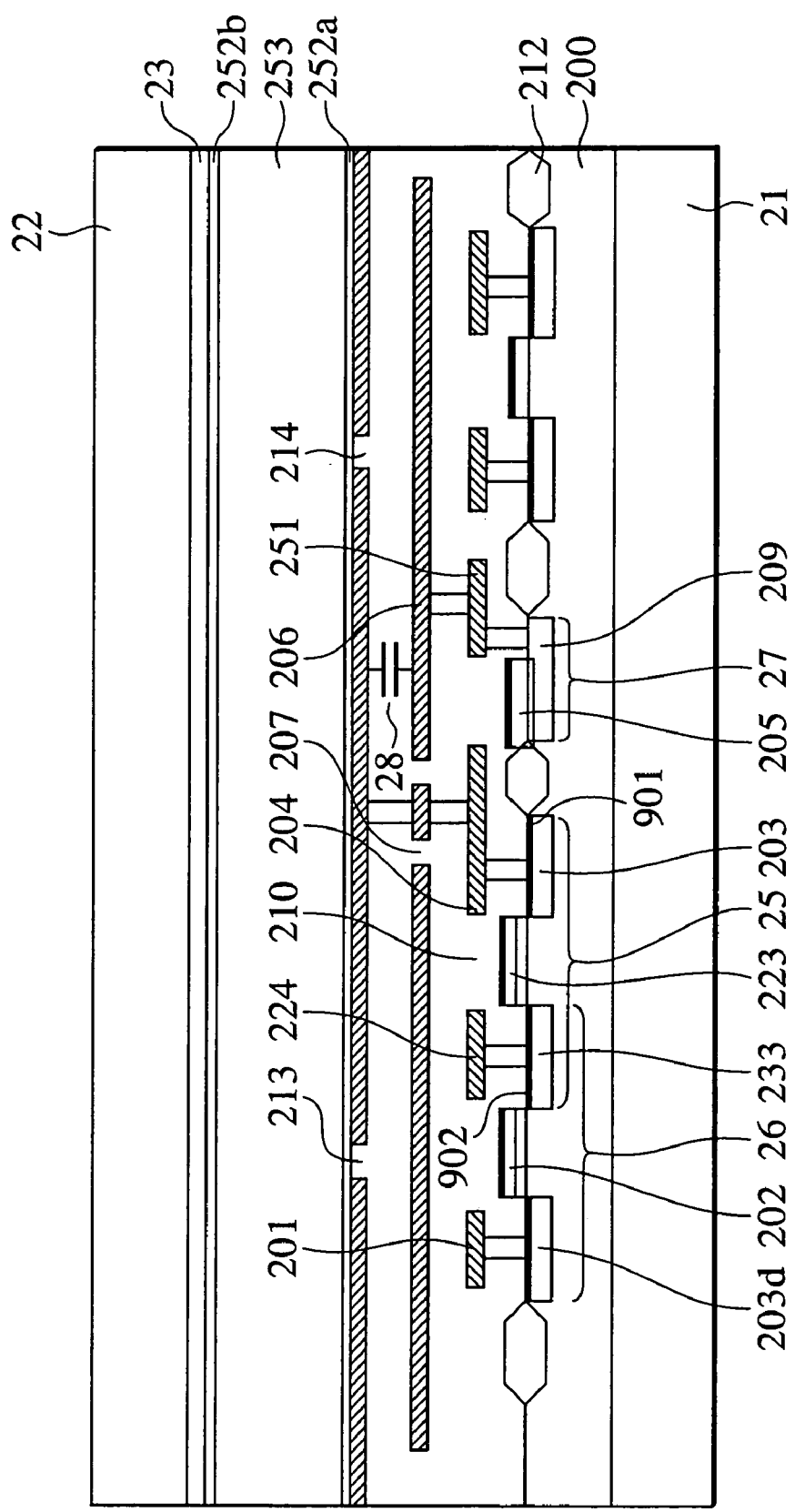
FIG. 11 is a schematic sectional view showing a light blocking structure of a second embodiment of an LCD according to the present invention.

Next, a light blocking structure according to a second embodiment of the LCD of the present invention will be explained. FIG. 11 is a sectional view showing the light blocking structure according to the second embodiment. In FIG. 11, the same parts as those of FIG. 10 are represented with the same reference numerals to omit their explanation. According to the embodiment of FIG. 11, the top of a diffusion region 233 corresponding to a common node of first and second transistors 25 and 26 is covered with a contact layer 902 that is directly laid on the diffusion region 233. A source diffusion region 203 of the first transistor 25 is covered with a contact layer 901 that is directly laid on the diffusion region 203. The structure of each of the light blocking layers 901 and 902 is realized by a salicide (self-align silicide) technique that is a source/drain diffusion region forming technique.

More precisely, on a side wall of a gate polysilicon electrode, a silicon dioxide spacer is formed by etching, a titanium layer is entirely formed by spattering, and an annealing treatment is carried out. At this time, $TiSi_2$(TiSi) is formed at a part where titanium, silicon, and polysilicon are in contact with each other. Removing titanium from the silicon dioxide spacer by, for example, wet processing forms a $TiSi_2$ (TiSi) contact layer of low resistance on each transistor electrode region (source, gate, or drain) by self-alignment.

This embodiment employs the salicide technique to directly form the contact layers 901 and 902 having a light blocking function on the diffusion layers 203 and 233, respectively. These contact layers 901 and 902 are formed in a self-aligning manner to realize a light blocking structure that completely covers the tops of the diffusion layers 203 and 233 that must be blocked from light.

Employing the light blocking structure with the contact layers 901 and 902 of this embodiment, as well as the light blocking structure with the wiring regions 204 and 224 formed in the metal layer of the preceding embodiment to cover the diffusion regions 203 and 233 may realize an LCD having a greater light blocking capability.

Embodiments of a light blocking structure for an LCD according to the present invention have been explained. Next, a storage capacitor structure suitable for an LCD according to the present invention will be explained.

Figure 12:
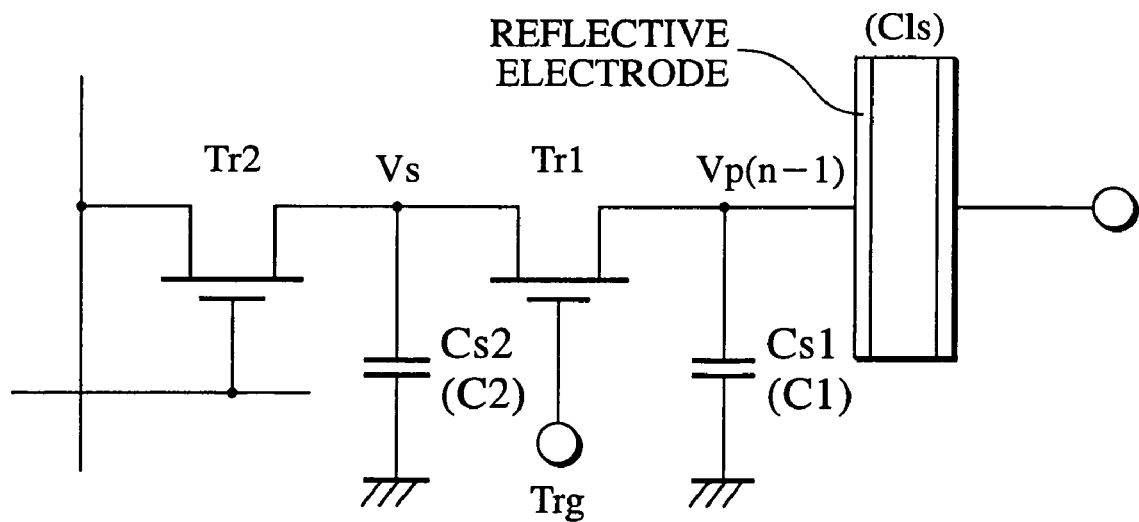
FIG. 12 is a view explaining a relationship between storage capacitance and a write signal to a reflective electrode in a pixel circuit of an embodiment of an LCD according to the present invention.

FIG. 12 is a view explaining a relationship between a storage capacitor and a write signal to a reflective electrode in a pixel electrode according to an embodiment of the LCD of the present invention. In FIG. 12, the same components as those of FIG. 6 are represented with the same reference symbols to omit their explanation. With reference to FIG. 12, the designing of two storage capacitors that form a pixel circuit in the LCD of the present invention will be explained. In FIG. 12, a first electrode of a capacitor Cs2 is connected to a common node between a drain of a first transistor Tr1 and a source of a second transistor Tr2. When a control signal Trg turns on the first transistor Tr1, a voltage Vs or a display signal stored in the capacitor Cs2 is transferred to a capacitor Cs1 on the reflective electrode side. This operation will be considered.

At this time, the capacitor Cs1 on the reflective electrode side is storing a display signal of a preceding frame. This initial voltage (preceding frame display signal) stored in the capacitor Cs1 is expressed as "Vp(n−1)." When the transistor Tr1 is turned on to transfer the voltage Vs stored in the capacitor Cs2 to the capacitor Cs1, a stored voltage Vp(n) in the capacitor Cs1 will be as follows:

$$Vp(n)=K \cdot Vs+(1-K) \cdot Vp(n-1) \qquad (1)$$

where K=C2/(C1+C2)

This expression (1) is based on an assumption that parasitic capacitance other than the capacitors is ignorable and that the capacitors Cs1 and Cs2 have static capacitance values of C1 and C2, respectively.

If the capacitance values C1 and C2 of the two capacitors Cs1 and Cs2 establish a relationship of C1<<C2, then K≈1 and Vp(n)≈Vs in the expression (1). Namely, irrespective of the initial voltage stored in the capacitor Cs1, the voltage on the reflective electrode side is substantially equal to the transferred signal voltage Vs.

Accordingly, to reduce the influence of a signal voltage of the preceding frame and effectively transfer a signal to a reflective electrode in the LCD of the present invention, it is preferable to increase the ratio of C2/C1 as large as possible, the C2 being the capacitance value of the second capacitor Cs2 connected to the common node between the first and second transistors Tr1 and Tr2, and the C1 being the capacitance value of the first capacitor Cs1 connected to an output terminal of the first transistor Tr1.

Increasing the capacitance ratio of C2/C1 may be realized by increasing the capacitance value C2 of the second capacitor Cs2 connected to the common node between the first and second transistors Tr1 and Tr2, or by reducing the capacitance value C1 of the first capacitor Cs1 connected to the output terminal of the first transistor Tr1.

Extremely reducing the capacitance value C1 on the reflective electrode side may cause a problem to deteriorate a signal storing performance. In an actual structure, not only the capacitance value C1 of the capacitor Cs1 but also diffusion capacitance Cj of the source diffusion region of the first transistor Tr1 and capacitance C1c of the liquid crystal layer are applied in parallel to the reflective electrode. These two parasitic capacitance values are not fixed but they are variable depending on an applied voltage and a liquid crystal optical response.

As a result, in a region where the size of the capacitance value C1 of the capacitor Cs1 formed on the reflective electrode side is insufficient and the value Cj or C1c prevails the value C1, there will be a problem that a write voltage to the pixel reflective electrode has signal-level dependency and shows a nonlinear characteristic. To cope with this problem, it is preferable for a pixel circuit of the LCD according to the present invention to design the capacitance value C1 of the capacitor Cs1 to be sufficiently larger than the parasitic capacitance values Cj and C1c.

According to the first embodiment of the LCD of the present invention shown in FIG. 10, the storage capacitor 28 (Cs1) to store a signal voltage for a reflective electrode is formed in a MIM structure consisting of the reflective electrode 208, the light blocking layer 206 under the reflective electrode 208, and the insulating layer formed between the reflective electrode 208 and the light blocking layer 206. The signal storage capacitor 27 (Cs2) connected to the common node between the first and second transistors 25 and 26 is formed in a MIS structure consisting of the polysilicon electrode 205, the high-concentration diffusion region of the semiconductor substrate 21, and a silicon oxide film formed between them.

In this way, this embodiment forms the two storage capacitor structures in different layers so that the regions of the two storage capacitors 27 and 28 may not compete with each other, and each may have a sufficient capacitance value to store a voltage. The ratio of the capacitance value of the storage capacitor 28 (Cs1) to that of the storage capacitor 27 (Cs2) can sufficiently be increased. Namely, the capacitance ratio C2/C1 can be made sufficiently large because the insulating layer of the capacitor Cs2 of the MIS structure can be formed very thin, usually ten to several tens of nanometers like a transistor gate oxide film, to thereby increase capacitance per unit area compared with the capacitor Cs1 of the MIM structure.

Figure 13:
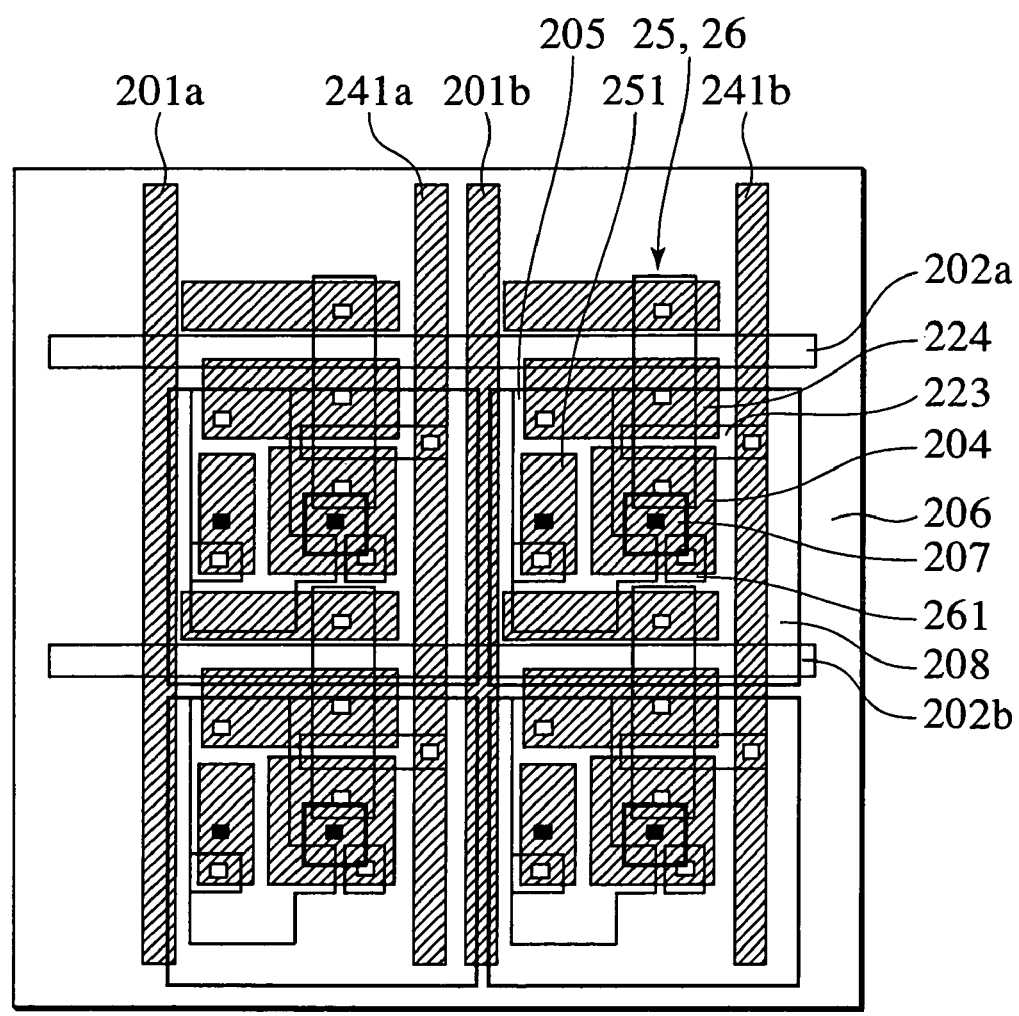
FIG. 13 is a schematic plan view showing the structure of a third embodiment of an LCD according to the present invention.

Next, a third embodiment of the LCD according to the present invention will be explained. FIG. 13 is a schematic plan view showing the structure of the third embodiment of the LCD according to the present invention. In FIG. 13, the same components as those of FIG. 9 are represented with the same reference numerals to omit the explanation thereof.

This embodiment provides two storage capacitors formed in each pixel circuit of the LCD with different structures from those of the preceding embodiments.

This embodiment divides the pattern of a polysilicon electrode serving as a first electrode of a storage capacitor into a first region 261 and a second region 205 as shown in FIG. 13. The first region 261 is connected to a source region of a first transistor 25 through a wiring region 204 formed in a first metal layer. The second region 205 is connected to a common diffusion layer of the first and second transistors through a wiring region 224 formed in the first metal layer.

According to this embodiment, the two storage capacitors have each a MIS structure consisting of a polysilicon layer, a silicon oxide film, and a high-concentration diffusion region of a semiconductor substrate. As explained in the preceding embodiments, the silicon oxide film of the MIS structure can be formed by the same process that forms a transistor gate oxide film, and therefore, a very thin oxide film of 10-nanometer order can be formed by precisely controlling the thickness thereof. Accordingly, it is possible to form capacitors that show large capacitance values per unit area, are of high precision, and realize high reproducibility in manufacturing. In addition, by optimizing the allocation of polysilicon electrode areas for forming the capacitors Cs1 and Cs2, the capacitance ratio C2/C1 can be designed to a required value. More precisely, when designing polysilicon electrode patterns, the area of the second region 205 may be set sufficiently larger than the area of the first region 261, to increase the capacitance ratio C2/C1.

Figure 14:
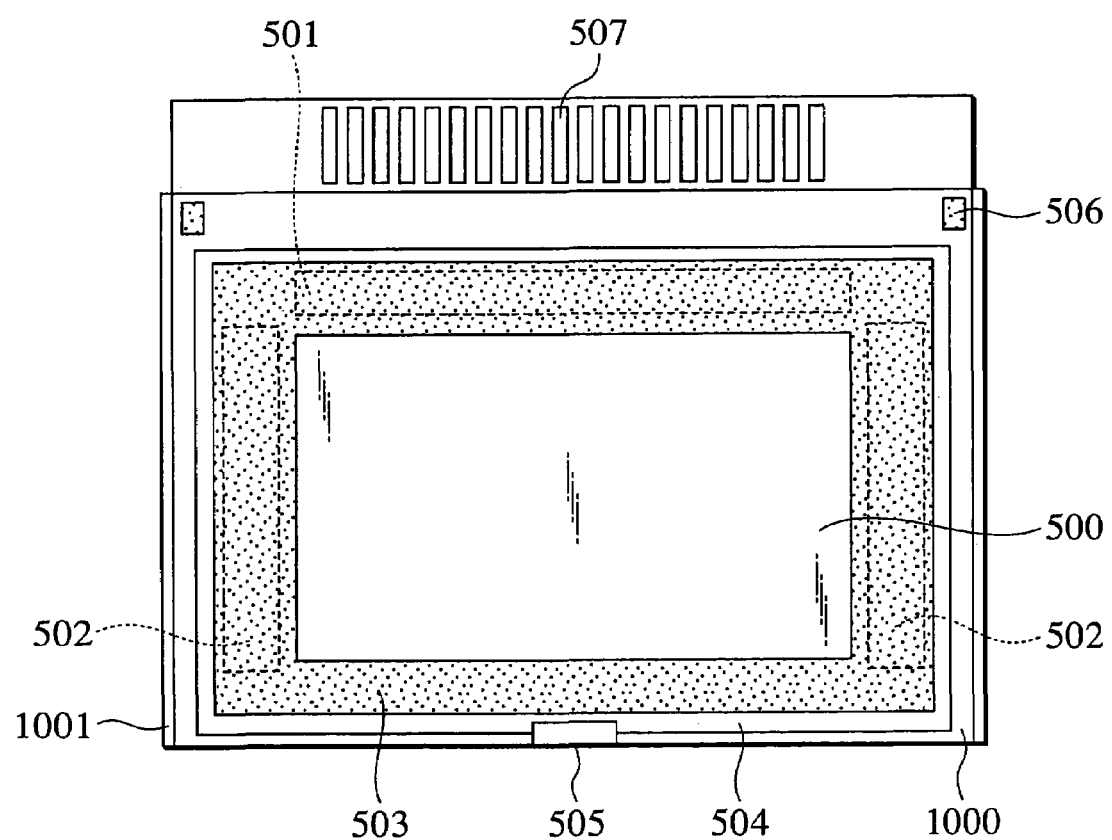
FIG. 14 is an explanatory view showing an assembly structure of an embodiment of an LCD according to the present invention.

FIG. 14 is a view explaining an assembly structure of an embodiment of the LCD according to the present invention. A semiconductor substrate 1000 forms a drive circuit thereon and includes a horizontal scan circuit 501 (corresponding to 5 of FIG. 6), a vertical scan circuit 502 (corresponding to 6 of FIG. 6), and a pixel circuit area 500 where all pixels $7_{11}$ to $7_{mn}$ are formed. A light blocking layer 503 blocks light for the horizontal scan circuit 501 and vertical scan circuit 502 and is realized by, for example, a wiring layer formed in the same layer where pixel reflective electrodes are formed, to cover the peripheral circuits. As a result, even if strong light is made incident to the peripheral circuit area, no malfunction will occur in the peripheral circuits. Above the light blocking layer 503, another material having an opening for the pixel circuit area 500 may be arranged and trimmed.

On each surface of the semiconductor substrate 1000 and a transparent substrate 1001 having a common electrode, a liquid crystal orientation process is carried out, and a seal area 504 forming a partition wall for liquid crystal cells is formed on one of the semiconductor substrate 1000 and transparent substrate 1001. The two substrates 1000 and 1001 are faced each other and are fixed. A seal material of the seal region 504 is provided with distributed particulate spacers to secure a required uniform value for the thickness of the liquid crystal cells. To maintain the thickness of the liquid crystal cells more uniformly, it is possible to uniformly form fine columnar spacer structures from, for example, resin material in the pixel circuit area 500 and peripheral circuit area.

Liquid crystals are poured into the liquid crystal cells through an inlet 505, which is sealed thereafter with resin material. A surface electrode 506 is formed on the semiconductor substrate 1000 and is made in contact with the common electrode formed on the transparent substrate 1001 through a conductive material, to electrically connect the two substrates to each other. Display signals, timing signals such as clock signals, various control signals, drive signals to the source power and the common electrode, and the like necessary for operating the drive circuits formed on the semiconductor substrate 1000 and for driving liquid crystals are input through an external connection terminal group 507, which is attached to a flexible substrate and is connected to external drive circuits (not shown).

As explained above, the present invention employs light blocking layers and/or contact layers to substantially completely prevent light from entering first and second diffusion regions that are photosensitive regions of first and second switching elements in each pixel circuit of an LCD. The present invention, therefore, can provide a projection LCD having a high-resolution, fine display panel and can realize a projection LCD having sufficient light blocking capability and light resistance to cope with high-luminance, large-screen projection.

According to the present invention, the supply of display signals to reflective electrodes of all pixel circuits is simultaneously carried out by turning on the first switching elements of the pixel circuits. This results in making the polarity switching of an alternating current signal coincide with the polarity switching of display signals for all pixel circuits. Accordingly, there will be no influence of write timing difference that occurs when writing display signals by scanning, thereby greatly reducing the amplitude of display signal voltage and decreasing the operating voltage and source voltage of the peripheral drive circuits and pixel circuits. As a result, semiconductor elements that form LCD circuits of the present invention require no high-voltage-withstanding special structure or process. In addition, the present invention greatly relaxes limits on operating voltage and withstand voltage related to the designing and manufacturing rules of semiconductor integrated circuits. Consequently, the present invention can realize an LCD having a fine, high-density display panel.

It should be understood that many modifications and adaptations of the invention will become apparent to those skilled in the art and it is intended to encompass such obvious modifications and changes in the scope of the claims appended hereto.

What is claimed is:

1. A liquid crystal display having a drive circuit substrate on which a plurality of pixel circuits are arranged in a matrix, a transparent substrate on which a common electrode is formed, and a liquid crystal material held between the drive circuit substrate and the transparent substrate, each of the pixel circuits including a reflective electrode arranged to face the common electrode, a first switching element to transfer a signal when turned on, a second switching element to transfer a signal when turned on, a first capacitor having a first electrode thereof connected to a node between the first switching element and the reflective electrode, to store a signal input through the first switching element when the first switching element is in an ON state and supply the signal to the reflective electrode, and a second capacitor having a first electrode thereof connected to a common node of the first and second switching elements, to store an external signal input through the second switching element when the second switching element is in an ON state, second electrodes of the first and second capacitors of all pixel circuits being commonly connected, the liquid crystal display comprising, on the drive circuit substrate:

a metal layer formed under reflective electrodes and having an opening, the position of the opening being shifted along the surface of the drive circuit substrate to avoid the positions of gaps between the reflective electrodes of adjacent pixel circuits and block light; and a wiring layer formed under the metal layer and having first wiring that covers and is electrically connected to a first diffusion region corresponding to the common node of the first and second switching elements and second wiring that covers and is electrically connected to a second diffusion region corresponding to an output part of the first switching element, the first and second wiring being divided and electrically isolated from each other, the position of a gap between the first and second wiring dividedly formed in the wiring layer being shifted along the surface of the drive circuit substrate to avoid the position of the opening formed in the metal layer.

2. The liquid crystal display of claim 1, wherein the first capacitor comprises the reflective electrode, the metal layer, and an insulating layer formed between the reflective electrode and the metal layer.

3. The liquid crystal display of claim 1, further comprising:

a signal supply unit configured to supply display signals to the reflective electrodes through the first switching elements, the polarity of the display signals being inverted every vertical scan period, a level range of each of the display signals for a positive polarity period and that for a negative polarity period overlapping such that a black display signal level and white display signal level in the positive polarity period correspond to a white display signal level and black display signal level in the negative polarity period, and in synchronization with the timing of supplying the display signals to the reflective electrodes, supply an alternating current signal to the common electrode, the polarity of the alternating current signal being opposite to that of the display signals and the level of the alternating current signal being greater than the amplitude of a black display signal.

* * * * *